Nov. 8, 1955
S. LARKIN
2,722,903
MACHINE ADAPTED FOR THE MANUFACTURE
OF SHOULDER PADS AND OTHER ARTICLES
Filed Jan. 15, 1953
5 Sheets—Sheet 3
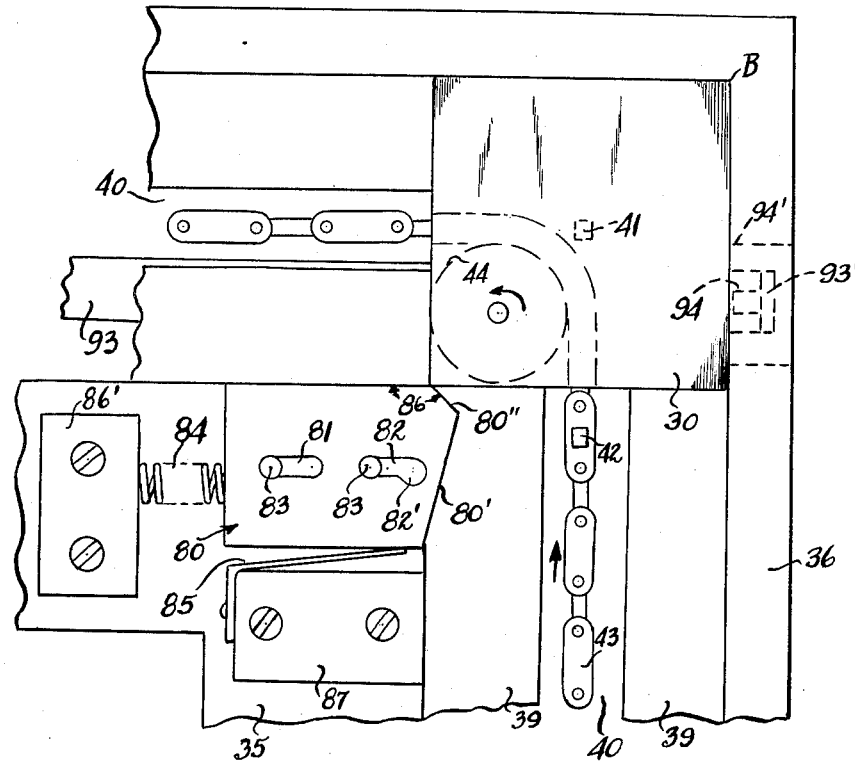
FIG. 3.
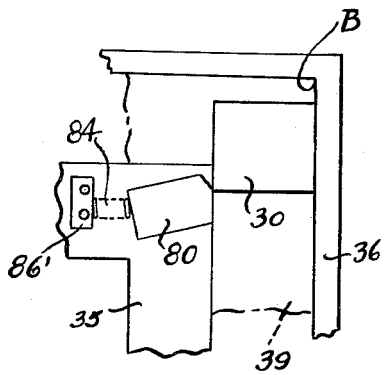
FIG. 4.
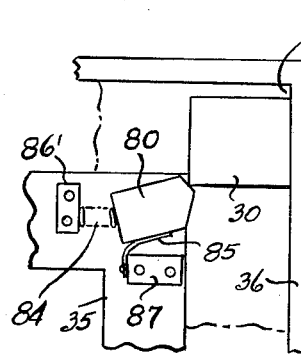
FIG. 5.
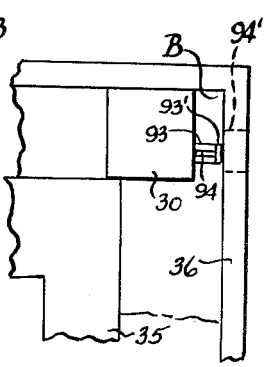
FIG. 6.
INVENTOR,
SAM LARKIN
by
ATTORNEY Nov. 8, 1955
S. LARKIN
2,722,903
MACHINE ADAPTED FOR THE MANUFACTURE
OF SHOULDER PADS AND OTHER ARTICLES
Filed Jan. 15, 1953
5 Sheets-Sheet 4
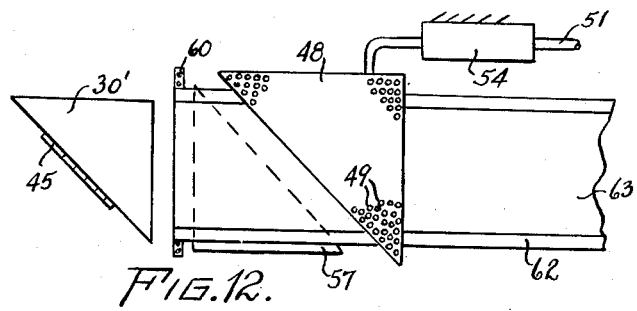
FIG.12.
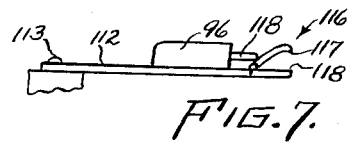
FIG.7.
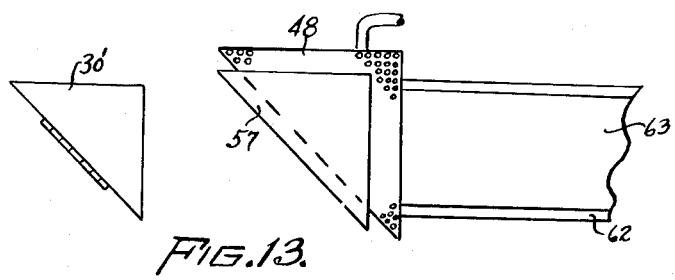
FIG.13.
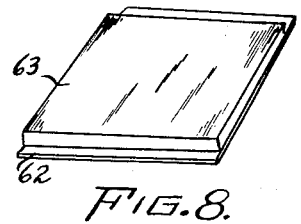
FIG.8.
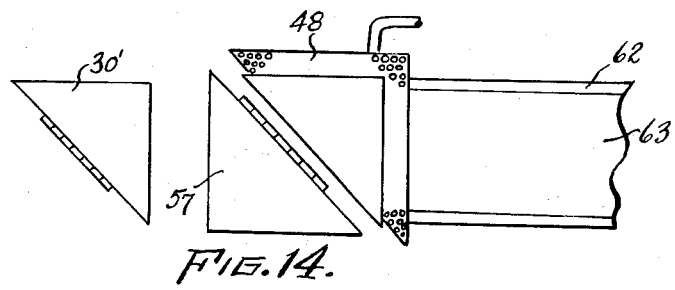
FIG.14.
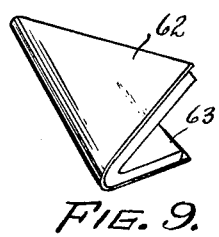
FIG.9.
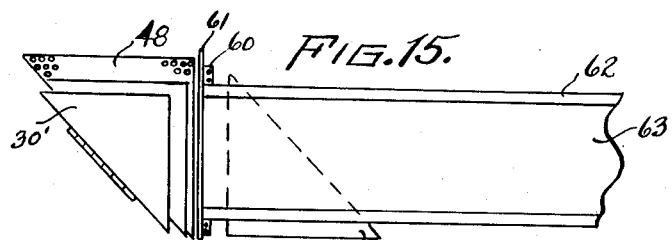
FIG.15.
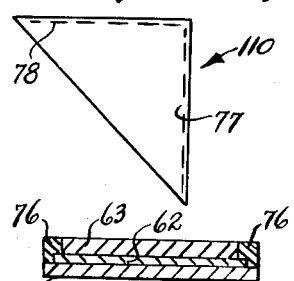
FIG.10.
FIG.11.
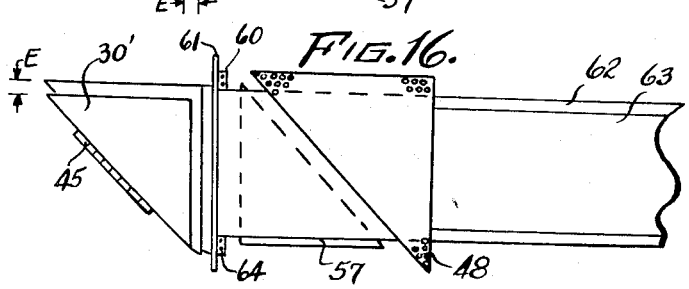
FIG.16.
SAM LARKIN,
INVENTOR
by
ATTORNEY Nov. 8, 1955     S. LARKIN     2,722,903
MACHINE ADAPTED FOR THE MANUFACTURE
OF SHOULDER PADS AND OTHER ARTICLES
Filed Jan. 15, 1953     5 Sheets-Sheet 5
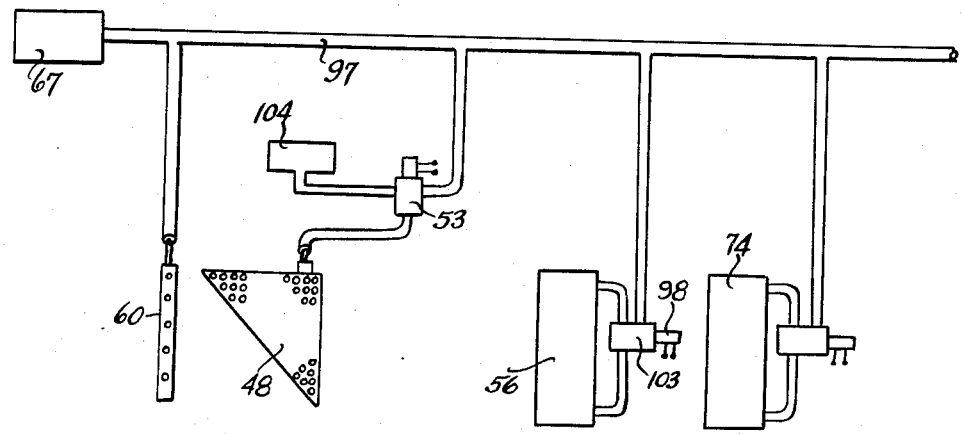
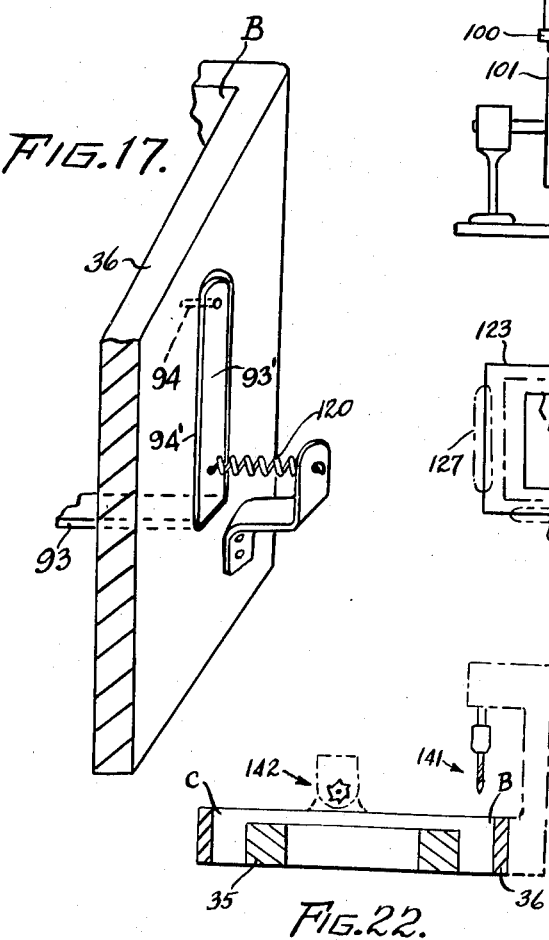
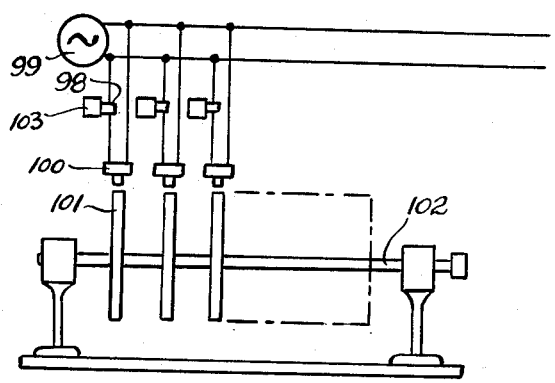
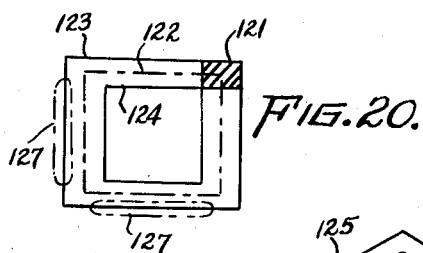
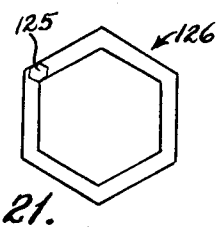

United States Patent Office 2,722,903
Patented Nov. 8, 1955

2,722,903

MACHINE ADAPTED FOR THE MANUFACTURE OF SHOULDER PADS AND OTHER ARTICLES

Sam Larkin, Brooklyn, N. Y.

Application January 15, 1953, Serial No. 331,475

5 Claims. (Cl. 112—2)

The present invention relates to automatic machinery adaptable for the manufacture of articles whose parts need be seamed, cut or otherwise operated on along more than one direction. As a particular example, I show an automatic machine for making shoulder pads in accordance with this invention.

The principal object of this invention is to provide a novel and improved automatic machine of the character mentioned, which receives a supply of material, folds and cuts it off if necessary, then seams or otherwise operates thereon and finally delivers the products finished.

Another object hereof is to provide novel and improved mechanisms in a machine of the nature described, for transporting the work around a circuitous path of intersecting straight lines with provision that the work rest a while at all vertices of such path. There is also provision for loading new work to be operated on and there may be means to eject the product when finished. Various devices are in place along the path to perform required operations on the work in its cycle of movement along the path.

A future object is to provide an automatic machine of the type set forth, which requires a minimum of operator's attention beyond the mounting of new material supply and which is efficient in carrying out the purposes for which it is designed.

Other objects and advantages will become apparent as this disclosure proceeds.

As a matter of example, I have chosen to show this invention in practice, as an automatic machine for making shoulder pads. In the preferred embodiment of such a machine illustrated in the accompanying drawings forming part of this specification, a frame offers an endless path for four carriages which follow one another around the perimeter of a square; one carriage moving along each side of such square-shaped path respectively. All said carriages come to a halt at the corners and then proceed simultaneously. During the period of rest, material delivered from supply rolls, is properly folded, shifted into a clamping means on one of the carriages and cut-off as is required; the carriage so loaded, being at a particular corner of said path. The work in this particular carriage, during the next two movements of such carriage, is operated on by sewing machines. The work on such carriage is now complete and in subsequent travel of said carriage, is ejected. Suitable means may be provided to cut the thread. Each carriage is loaded as it reaches the loading station. Hence four shoulder pads are had during each run of a carriage around said path.

I will now describe this machine by referring to the drawings wherein similar characters of reference indicate corresponding parts in all the views.

Fig. 3 is an enlarged fragmentary top plan view of a corner region of the carriage track, showing one of the carriages at rest position in the very corner of said track. It might here be mentioned that the carriages, each comprise a square block on which is a clamp means to hold the work. In Fig. 3 this clamp means is not shown so that the structure may be easier understood. In this figure, said block has become disengaged from an endless moving belt or chain which has transported it to nearly corner position, but it has been automatically shifted to very corner position by action of a spring-loaded cam block.

Fig. 4 is a similar view drawn to a smaller scale, showing the carriage block immediately prior to its disengagement from the moving chain belt, but said carriage block during its movement towards corner position, having shifted the cam block to the position shown, where it is about ready to act to shift the carriage block into very corner position.

Fig. 5 is similar to Fig. 4, but shows the cam block shifting the carriage block into corner position.

Fig. 6 is a similar view showing the carriage block shifted into the next part of the path of its travel, whereupon it continues to move because it has again become engaged by the moving chain belt.

Figure 1:
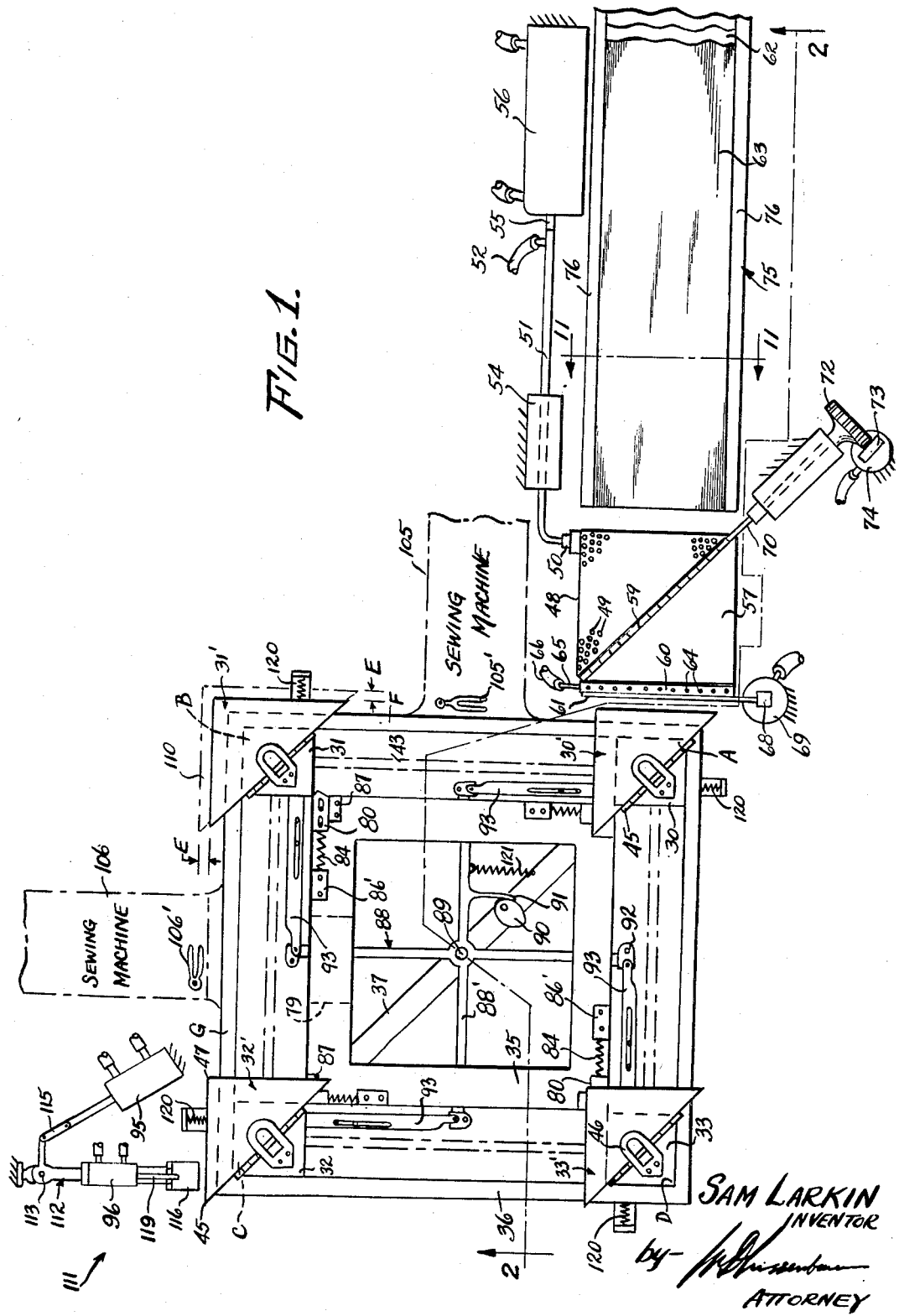
Fig. 1 is a top plan view of a shoulder pad making machine embodying the teachings of this invention.

Fig. 7 is a side view of a portion of an ejector means included in Fig. 1, which means is for the removal of finished work.

Fig. 8 is a perspective view showing the actual pieces of material from which one style of shoulder pad is made.

Fig. 9 is a perspective view showing the manner in which said pieces of material are folded before being fed into a clamp on the carriage at loading position of the machine.

Fig. 10 is a perspective view showing the finished shoulder pad made by this machine.

Fig. 11 is a section taken at lines 11—11 in Fig. 1.

Figs. 12 through 16 are diagrammatic views showing the successive steps of the manner in which continuous strip material is folded, fed, cut and finally loaded onto a carriage.

Fig. 17 is a fragmentary perspective view showing a corner of the carriage track and means for shifting a carriage to come under the influence of a continuously moving drive belt, as will be explained.

Fig. 18 is a diagrammatic view indicating means for operating double-acting air cylinders included in the embodiment illustrated, and for furnishing suction and blowing action at various components.

Fig. 19 shows shaft carrying cam cooperating with electrical switches for controlling in predetermined timed relation, the operation of electrically-operated valve means which determine the operation of the system shown in Fig. 18.

Figs. 20 and 21 are diagrammatic showings of modified forms of carriage tracks.

Fig. 22 is a fragmentary view showing the employment of means to perform milling and drilling operations on articles of work held on the carriages.

In the drawings, four carriages denoted generally by the respective numerals 30, 31, 32 and 33 are afforded a circuitous path for travel along the perimeter of a square. Such path is provided by the concentrically, horizontally positioned, spaced square frames 35 and 36 held in assembly in any suitable manner, as for instance by the diagonally positioned bar 37 which supports the inner frame 35 onto the outer frame 36. The resulting machine frame may be mounted on a table 38. Each carriage is comprised of a free square block adapted to slide in contact with the track afforded by the outer wall of the inner frame 35 and the inner wall of the outer frame 36. A floor 39 is provided below the top ends of the walls of said frames, for the blocks to rest and slide on in their travel around the track. There is a lengthwise slot 40 through each length of said floor, midway between the opposite walls of the frames 35, 36. It is evident that such slots in the four lengths around the track, all together make a single slot all around the perimeter of a square. Each carriage block has a teat 41 extending downwardly from the center of its undersurface and through said slot in the floor 39 to be intercepted by lugs 42 extending upright on an endless chain belt 43 which runs along the slot 40, below the said floor. This chain belt is carried on four sprockets 44, each of which is at a corner region of the carriage track, and of course below the floor. The diameter of each such sprocket and the axes on which they are respectively mounted are such, that the teat 41 of a carriage block in a very corner of the track, is beyond the locus of movement of the lugs 42, as is shown in Fig. 3, and also such that the arcual path along which the chain belt travels around a sprocket, shall be within the confines of the underside of the block when the latter is in a corner position.

Each carriage block has a clamp thereon which is spring-biased to close and adapted to hold and grip sheet materials spread between its jaws 34, 34'. Each of such clamps 30', 31', 32' and 33' comprises the horizontally positioned plate 34' which is fixed atop the block carrying it, and a second plate 34 atop such fixed plate and hinged thereto. Such plates are all of equal size and in the embodiment illustrated are all isosceles right angle triangular in shape, with hinge axis line 45 of the upper jaw along the base of such triangular form. The hinge axes of all the clamps are parallel to each other and diagonally of the carriage blocks respectively. All clamp jaws extend to one side of the square track along which the carriages move, and are constant in such position because the carriages have no rotary movement; their only movement being along the sides of a square as mentioned. The numeral 46 denotes a blade spring secured to each block respectively, acting to keep its associated clamp closed. The lips 47 of each clamp are flared to facilitate the entrance of a pusher blade 48 with sheet material it carries, between the clamp jaws. The clamps are loaded respectively when they are at position or corner "A." Since chain belt and hence carriage travel is counter-clockwise in the machine shown, the other corner positions along the track are in succession designated respectively by the letters "B," "C" and "D." At that side of the machine towards which all the clamp jaws extend as aforesaid, there is means to supply work to the carriages when they respectively are at station "A," which means will now be described.

Figure 2:
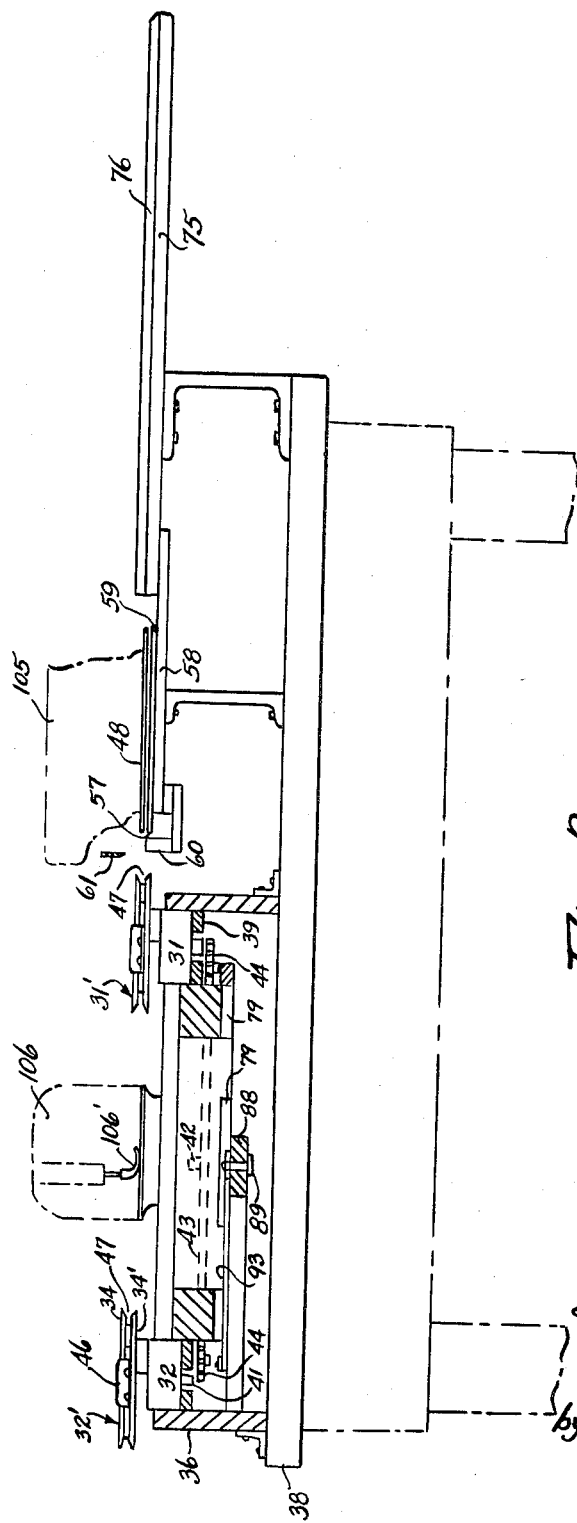
Fig. 2 is a section taken at lines 2—2 in Fig. 1. Several parts are omitted in order to attain clarity of illustration.

The pusher blade 48 may be a hollow structure whose top and bottom walls are perforated as at 49, and is provided with a port 50 to its interior. A tubular member 51 is connected to said port and to a hose 52 communicatively; said hose leading to a valve 53 affording the application of either a suction or a blowing action to occur as may be required at said perforations 49. Said pusher blade 48 lies horizontally and is mounted for sliding movement in its plane to enter between the jaws of the clamp on the carriage which is at station "A," and to be withdrawn therefrom; such line of movement in the machine shown, being parallel to the track line between the stations "A" and "D." For the purpose intended, said pusher blade is triangular, similar to but somewhat larger than the clamp plates, and is correspondingly positioned with such plates, whereby upon movement of said pusher blade to its furthest position within a clamp at station "A," the plates of said clamp will be within the confines of said blade 48. The tubular member 51 is longitudinally slidably mounted in the fixed bearing 54 where it is held against axial rotation in any suitable manner, and said member 51 is coupled to be an extension of the solid piston rod 55 of a double-acting pneumatic cylinder device 56. In normal rest position shown in Figs. 1 and 2, this pusher blade 48 is at a distance from station "A." In such space there is a folding plate 57 hinged atop a platform 58, along an axis line 59. This folding plate in normal rest position, extends from its axis line towards station "A" with its exposed surface flat, horizontal and preferably in the plane of the top surface of the lower plates of the clamps on the carriages. Said folding plate 57 is similar in size and shape of the pusher blade 48, and its axis line of swing 59 is parallel to the axis lines 45 of the clamp means on the carriages. Also in the mentioned space next to station "A," there is a fixed cutting blade 60 which cooperates with a movable cutting blade 61 to shear ribbon materials 62, 63.

The fixed shearing blade 60 extends up to the plane of the top surface of the lower jaws of the clamping means on the carriages, and has a hollow therein communicative with perforations 64 in its top wall and with a port 65 connected by a hose 66 to a source 67 effecting a suction action at the said perforations. The movable shearing blade 61, positioned between said fixed shearing blade and the station "A," is in normal rest position above the plane of the top surfaces of the lower jaws of the clamping means on the carriages, and is fixed to or otherwise suitably associated for movement with the piston 63 of a vertically positioned double-acting pneumatic cylinder device 69. The shaft 70 which may be an extension of the folding plate 57, is rotatably mounted in a fixed bearing 71 and carries a gear 72 which is in engagement with the rack 73 on the piston of a double-acting pneumatic cylinder device 74 positioned vertically. The ribbons 62, 63 are laid along a table 75 and are guided in desired alignment between the bars 76 which extend along the longitudinal edges of said table, parallel to the line of movement of the pusher blade 48. For shoulder pads, ribbon 62 is of fabric or other suitable sheet material for the pad's cover member, while the upper ribbon 63 on the table 75, is of batting; such ribbons coming off supply rolls not shown. The lower ribbon 62 may be wider than the batting 63 as in Fig. 8, or they may both be of equal width if desired. In any event the width of the lower ribbon, for the machine illustrated, should be greater than the length of the equal free sides of the plates constituting the carriage clamps, so that when the work shown in Fig. 8 is loaded into the clamp at position "A," its edges which are in right angle relation shall extend free out of the clamp jaws the distance "E" to afford lanes for sewing of the stitch lines 77 and 78, or for otherwise sealing or operating on such exposed lanes of the work during travel of the carriages 30 to 33.

Referring now to Figs. 3 through 6, explanation will be given of mechanism provided at each corner or station region of the track along which the carriages (the blocks) 30 through 33 move and what will be described as relating to one such station, will pertain alike to all as to mechanism and carriage movement. Consider the carriage 30 moving from station "A" towards station "B." The numeral 80 denotes a cam block mounted for movement atop the track frame. In normal rest position shown in Fig. 3, said cam block extends into the path of the carriage, presenting a comparatively long edge 80' which is first contacted by said carriage, and a comparatively short edge 80" which contacts said carriage at a very corner edge thereof. These conditions are shown successively in the Figs. 4 and 5 respectively. The cam block 80 is engaged in slots 81 and 82 by pins 83 fixed in the track frame member 35; the end of slot 82 nearest the carriage path, being enlarged as at 82'. There is a stressed, comparatively strong compression coil spring 84 acting to push the cam block 80 into the carriage path and a relatively weaker blade spring 85 acting to shift said cam block towards the carriage path portion between the stations "B" and "C," by a slight turning movement. The fixed blocks 86' and 87 serve to mount the springs 84 and 85 respectively as shown. The cam block's edges 80' and 80", make an obtuse angle. At normal rest position of the cam block 80, the vertex edge of angle 86, is in the plane of that edge of the block 30 at station "B," which faces station "A," and the pins 83 are at the ends of the slots 81, 82, which are furthest from the carriage track between stations "A" and "B," in which position, the tooth of the cam block, determined by the edges 80', 80'' is in the carriage path between said two stations.

The numeral 88 indicates a four-spoke spider pivotally mounted at 89 on the bar 37; such point of pivot being the center of the square carriage-path. Each spoke 88' extends through an opening 79 in one side of the inner frame 35 respectively; such opening being sufficient to allow the required movement of the spider about its axis, as is determined by the cam 90 cooperating with a cam follower 91 extending from one of the spokes. Suitable drives not shown, continuously move the chain belt 43 and revolve this cam 90; said cam making four revolutions per one circuitous movement of a point on said chain around the carriage track. The spider 88 lies and moves in a horizontal plane; each of its spokes being respectively pivotally coupled at its outward end by a link 92 to a slidably mounted bar 93 respectively; the under-supports for said bars being omitted to attain clarity of illustration. Each of these bars 93 extend from their juncture with a spoke, across a station position respectively, below the path of the chain belt 43, and end in and at the bottom of an upright slot 94' which is through the walls of each arm of the outer frame part 36 respectively, as seen in Fig. 17. Such ends of the bars 93, have an upright portion 93' which carries a pin 94 at such height that upon movement of the bars 93, caused by the swinging movement of the spider 88, said pins 94 will each contact and push one of the carriage blocks 30 through 33, into the next leg of the track respectively, a sufficient distance whereby each of said carriage blocks will again be subject to the influence of the chain belt 43 to be driven thereby towards the next station. The design of cam 90 is such that the carriage blocks are shifted by spider movement occurring after the carriage at station "A" is loaded with the folded material shown in Fig. 8, and the loading or here called the pusher blade 48, has left the clamp means on the carriage at this station. The carriage in Fig. 6, is shown shifted due to action of pin 94, so that said carriage is now under influence of the chain belt 43, for movement towards station "C."

All the pneumatic cylinder devices 56, 74, 69, 95 and 96 are of the double-acting type and each is controlled by an individual electrically-operated solenoid actuated valve whose intake port is connected to a suction supply line 97 from a suitable exhaust pump apparatus 67. The solenoids 98 are in circuit with a source of electric current 99, and each is controlled by an electrical switch which may be of the push-button type indicated diagrammatically at 100. Solenoid controlled valves 103 of this nature, are well known in the machine art and therefore need no further explanation. Operation of said switches 100 is effected in a predetermined timed relation to accomplish the required cycle of operation of the machine in so far as the operation of the said respective pneumatic cylinder devices are concerned, by being respectively controlled by cams 101 respectively on a constantly rotating shaft 102. This shaft makes four revolutions per circuit of the chain 43, and hence rotates at the same speed as the cam 90. The valve 53 is also solenoid controlled, and a cam on shaft 102 is provided therefor together with an associated switch and circuit for operation of its solenoid. Said valve 53 is a two-way valve, adapted to present suction action from line 97, or blowing action from a blower 104, at the surfaces of the pusher blade 48 at such times as the cycle of operation requires. It might here be noted that during each so-called cycle of operation of the machine herein, the carriages are first at rest at the stations A, B, C, D respectively. The carriage at station "A" is loaded with work folded and cut off from a supply of material 62, 63.

The carriages 30 through 34, then move simultaneously to the next station around the track of their travel, where each comes to rest. This ends one cycle of operation. During such travel of the carriages, the work is operated on by for instance a sewing machine 105 positioned between stations "A" and "B," and by another sewing machine 106 positioned between the stations "B" and "C." The presser feet of these sewing machines are indicated by the numerals 105' and 106' respectively.

It is evident that the shoulder pad 110 is completely sewn after it has passed the sewing machine 106. An ejection device indicated generally by the numeral 111 is therefore provided to one side of station "C." Such device may consist of a bell-crank lever 112 pivotally mounted on the frame of the machine at 113. One arm of this lever and the piston of a double-acting pneumatic cylinder device 95, are respectively pivotally linked to a link 115. As seen in Fig. 7, the other arm of said lever 112 carries a clamp 116 spring-biased to open, and a double-acting pneumatic cylinder device 96, whose piston 119 when moving towards station "C," acts to close said clamp 116 which thereby grips the shoulder pad 110. Upon movement of a carriage from station "C" towards station "D," the shoulder pad thereon is freed from the clamp on such carriage because the gripping action of clamp 116 is very strong as compared with the grip afforded by the carriage-borne clamp. Now upon successive operation of the cylinder devices 95 and 96 so that their respective pistons travel inward of the cylinders, the bell-crank lever 112 will be swung (clockwise in Fig. 1) and the shoulder pad 110 held in the clamp 116 will drop into a receptacle not shown. It might here be noted, though not shown, that devices constructed and operated as the aforesaid ejection device 111, but whose lips 117 and 118, shown in Fig. 17, afford a cutting action, may be included at regions indicated by the letters "F" and "G" in Fig. 1, for cutting the thread between the work on successive carriages.

It is to be noted that the chain belt 43 has four equi-spaced interceptor lugs 42 therealong and that the tension coil springs 120, 121 act to hold the pins 94 out of the carriage path and maintain engagement of the cam 90 with its follower 91.

In assembling the machine of Fig. 1, the components thereof are arranged as follows:

All piston rods of all the pneumatic cylinder devices 56, 74 and 96 are at their innermost positions in their respective cylinders, while those of 69 and 95 are at their outermost positions in relation to their respective cylinders. The valve 53 is at the setting that suction shall occur at the surfaces of the pusher blade 48. All pins 94 are out of the carriage path. The cam 90 and the belt 43 is so positioned, that the carriages will commence being moved by the said belt immediately after the work is loaded into the clamp on the carriage at position "A," and the pusher blade 48 withdrawn from such clamp. The cloth-feeding devices (not shown) of the sewing machines 105, 106 should feed at a rate equal to the linear speed of the chain belt 43, as is obvious. The speed of said chain belt should be such that the rest period of the carriages at the respective stations A, B, C, D, will be sufficient for the folding, cutting and loading of the work and the withdrawal of the pusher blade 48 to permit carriage movement. The pusher blade 48 is between the table 75 and the hinge 59 of the folding plate 57, which latter lies horizontal between the stationary cutting blade 60 and said pusher blade. The movable cutting blade 61 is above the plane of said pusher blade 48. The sewing machines are threaded. They may be Merrow machines having a trimming blade as is well known in the art. Off reels not shown, ribbon materials 62 and 63 are spread on table 75 and along the longitudinal guides 75. As in Fig. 12, said ribbons are set to the cutting edge of the stationary blade 60 and positioned under the pusher blade 48, but over the folding plate 57. The machine is now ready to be operated.

The chain belt 43, the cam 90, the shaft 102, the sewing machines 105, 106, the suction source 67 and the blower source 104, are all set to work simultaneously. The machine now operates as follows.

Referring to Figs. 1 and 12, the ends of the ribbon material 62, 63 though held by suction atop the stationary cutting blade 60, is forced therefrom by a half-turn movement of the folding plate 57 to the position shown in Fig. 13, caused by operation of the pneumatic device 74 wherein its piston has movement upward in its cylinder. Such movement of the folding plate has caused a folding over onto the top surface of the pusher blade 48, of end triangular portions of the ribbon material 62, 63. Suction acting at both surfaces of said pusher blade, holds the ribbon materials in their folded format thereon as in Fig. 14, and permits the folding plate 57 to return to initial position which is effected by reverse operation of the pneumatic device 74 accomplished by action of the related cam on shaft 102 and the associated solenoid circuit and valve mechanism. Now pneumatic device 56 is actuated that its piston shall move towards the left in Fig. 1 and as indicated in Fig. 14; the extent of such movement being such that the pusher blade 48 has travelled with the folded ribbon ends it carries, into the clamp 30' on carriage 30 which is at station "A" in Fig. 1. The pneumatic device 69 is now operated to bring the shearing blade 61 down, to cut off the ribbon material as shown in Fig. 15 and back up again to its initial position. The pneumatic device 56 is now operated to bring the pusher blade 48 back to its initial position as in Fig. 16, but before doing so, the valve 53 is operated to be set for blowing action to take place at the surfaces of the pusher blade, so that the cut-off pieces as in Fig. 9, shall remain in clamp 30'. After the pusher blade has returned to initial position, the valve 53 is operated to be set to effect suction action at the pusher blade surfaces. It is to be noted that the ribbons 62, 63 which are freely longitudinally movable along table 75, have been advanced towards station "A" by being pushed on by the pusher blade in its movement towards said station.

Soon after the pusher blade 48 is clear of the clamp 30' and the work it has loaded therein, the chain belt 43 commences to move and the cam 90 now causes the spider 88 to move, whereby the bars 93 are slid so that the pins 94 shift the carriage blocks 30—34 whose teats 41 come into the locus of movement of the interceptor lugs 42. Soon after, each lug 42 engages a teat 41, and all carriages move simultaneously towards the next station respectively. The spider 88 quickly returns to its initial position after the pins 94 have accomplished their purpose. Each carriage in its movement towards the next station, meets the cam block 80 before entering such station. The purpose and action of the cam blocks 80 has been explained. After such cam blocks have acted on the respective carriage blocks and shifted them into true station position respectively, the carriages are at rest. The cycle of operation of the machine is complete and continues to repeat. During each cycle, the carriage at station "A" is loaded with work. This loaded carriage during its movement from station "A" to station "B," has its work pass through the sewing machine 105 where seam 77 is performed. During the next cycle, this carriage moves from station "B" to station "C." During such movement to station "C," the work passes through the sewing machine 106 where seam 78 is performed. As soon as this carriage reaches station "C," or in fact any other carriage, the pneumatic device 96 is operated to close the clamp 116, between whose jaws 117, 118, an edge of the work lies. When said carriage moves away from station "C" towards station "D," clamp 116 continues to hold the work and frees it from the carriage's clamp. As soon as the work is so freed, the pneumatic device 95 is operated to swing the clamp 116 away from and then immediately back again from station "C." While said clamp is away, the pneumatic device 96 is operated to open the clamp, thus dropping the finished work into a receptacle provided therefor. With the provision of thread cutting devices at positions "F" and "G," the shoulder pads made will be separate. Otherwise they will be joined by a length of thread which need be trimmed off by hand.

It is to be noted that in place of the sewing machines included in the embodiment illustrated, other devices may be substituted to perform various operations on the work which may be of fabric or hard materials, depending upon the nature of the article to be made and the processes to be applied thereto. Instead of sewing, the operations may be cementing, electronic sealing, milling as at 142, pinking, crimping, perforating or any others which can be performed while the work is in motion between stations, and for instance drilling as at 141 and die work can be performed on the work while the latter is at rest at stations other than where loading takes place. The work transporting means here taught where the work is carried from station to station along intersecting paths, stopping at each vertex position in the path and presenting different parts of the work to be operated on in its travel, lends itself to many uses. In some installations, loading and ejection may be by hand.

It is also to be noted that the carriage blocks need not be square, but may be rectangular, meaning oblong as at 121 in Fig. 20. Here too, the locus of movement of the center of the block 121 is a square indicated as 122, though the respective widths of adjacent sections of carriage track are different so as to suit the dimensions of said block. The numeral 123 denotes the inner wall of the outer track frame, while 124 indicates the outer wall of the inner track frame. Also, if required, the same scheme of article transportation may be used on endless tracks having an even number of sides in regular polygonal format, using carriage blocks of similar shape thereto. For instance, the blocks 125 and their track 126 may be regular hexagonal. Here there would be six stations with operating performing devices in place between certain of the stations and where required at the stations, as use would dictate. Instead of a single drive belt 43, each part of the track may have its own continuously moving belt 127, which would permit the use of square blocks in an oblong track, with successive belts running at different speeds so that the time of run of a carriage along any track part shall be alike between stations.

This invention is capable of numerous forms and various applications without departing from the essential features herein set forth. It is therefore intended and desired that the embodiments herein set forth be deemed merely illustrative and not restrictive, and that the patent shall cover all patentable novelty herein set forth; reference being had to the following claims rather than to the specific description herein, to indicate the scope of this invention.

I claim:

1. In a machine of the character described, means serving as an endless track for a carriage to move on; said track being along a perimeter formed of intersecting lines thereby affording corners, a carriage positioned for sliding movement on the track; said track engaging the carriage to hold it against rotary movement with respect to said track, means to move the carriage in one direction around the track; such means comprising constantly moving endless belt means positioned between all the corners of the track, belt supporting means at each corner region of the track to guide the belt means for movement in a path towards a corner to movement in a path away from such corner, means carried on the belt means and extending therefrom, an element extending from the carriage; said element being in the path of the belt-borne means while the carriage is between track corners and said belt-borne means being out of the path of the carriage-borne element while said belt-borne means is moving about a belt-supporting means at a corner region of the track while the carriage is in a corner, means to shift the carriage into every corner it approaches, means to shift the carriage out of each corner towards the next corner of the track in the direction of its travel around the track at a predetermined time after said carriage had entered a corner, article-holding means mounted on the carriage and at least one work-performing means positioned along the track, adapted to contact and perform a predetermined operation of work on an article held by said holding means on the carriage during a predetermined time in each cycle of movement of the carriage around the track.

2. The mechanism as defined in claim 1, wherein the track means comprises an outer ring frame whose inner wall surfaces determine a regular polygon of even number of sides more than four, with all opposite sides in parallel relation respectively and an inner frame whose outer wall surfaces determine a similar polygon and wherein the carriage presents outer wall surfaces defining a similar polygon; the carriage being positioned between said frame members; one pair of opposite outer walls of the carriage being in sliding contact with opposite walls of said frame members between successive corners of the track respectively.

3. The mechanism as defined in claim 1, wherein the belt means comprises a single belt and including means at each track corner region for shifting the carriage in the corner of the track it has approached after the carriage-borne element has become disengaged from the belt-borne means and means to operate both of said carriage-shifting means in predetermined time relation with respect to belt movement.

4. The mechanism as defined in claim 3, wherein the means for shifting the carriage into the corner it has approached, comprises a spring-loaded cam means positioned to be met by the carriage in its movement by the belt-borne means towards said corner; said cam means being stressed during such movement of the carriage and adapted after the carriage has become disengaged from the belt element, to automatically shift the carriage into said corner.

5. The mechanism as defined in claim 3, wherein the means for shifting the carriage out of a track corner and towards the next track corner it is to go to, comprises a reciprocatably mounted member positioned for movement into such corner track region to contact the carriage and move same.

References Cited in the file of this patent
UNITED STATES PATENTS

| | | |
|---|---|---|
| 1,204,135 | Cook | Nov. 7, 1916 |
| 1,734,065 | Werotte | Nov. 5, 1929 |